United States Patent [19]
Lee

[11] Patent Number: 5,317,393
[45] Date of Patent: May 31, 1994

[54] STEREOSCOPIC IMAGE DISPLAYING APPARATUS

[75] Inventor: Chun Gyoo Lee, Kyonggi, Rep. of Korea

[73] Assignee: Samsung Electron Devices Company, Ltd., Kyonggi, Rep. of Korea

[21] Appl. No.: 918,215

[22] Filed: Jul. 21, 1992

[30] Foreign Application Priority Data

Aug. 28, 1991 [KR] Rep. of Korea .................... 91-14942

[51] Int. Cl.⁵ .............................................. H04N 13/04
[52] U.S. Cl. ...................................................... 348/58
[58] Field of Search ............................. 358/88, 92, 3; H04N 13/04

[56] References Cited

U.S. PATENT DOCUMENTS 2,983,835  5/1961  Frey ........................................ 358/88
3,275,745  9/1966  Var .......................................... 358/92
3,358,079 12/1967  Banning .................................. 358/92

OTHER PUBLICATIONS

H. Isono, et al. "3 D Flat Panel Displays Without Glasses" Japan Display '89, pp. 626–629.
Guichard, J. et al. "3-D Moving Pictures Display", Japan Display '83 pp. 558–559.

Primary Examiner—Howard W. Britton
Attorney, Agent, or Firm—Ladas & Parry

[57] ABSTRACT

A stereoscopic image displaying apparatus is disclosed. The pixels of the displaying apparatus consist of a plurality of pairs of odd columns pixels and even column pixels, and optical polarizing means for passing only one of vertical and horizontal components of light rays installed in front of the odd column pixels and the even column pixels, wherein if a user wears polarizing glass, then the user can see a clear stereoscopic image regardless of the position of the user.

26 Claims, 2 Drawing Sheets

STEREOSCOPIC IMAGE DISPLAYING APPARATUS

FIELD OF THE INVENTION

The present invention relates to a stereoscopic image displaying apparatus by which an object photographed by means of two cameras can be displayed in a 3-dimensional form.

BACKGROUND OF THE INVENTION

Generally, image displaying apparatus is classified into a panel type and a tubular type. In the panel type, there are EL (Electro Luminescent), PDP (Plasma Display Panel) and LED (Light Emitting Diode), etc., and in the tubular type, there are CRT (Cathode Ray Tube), etc.

As shown in FIGS. 1A to 1B, the plane type image displaying apparatus is constituted as described below. Pixels 2 are arranged in a transparent substrate 1 and connected to ICs 3 and 4. If image signals photographed by means of a camera are transmitted through the ICs 3 and 4 to the pixels 2, then the pixels 2 become luminescent for making a picture.

Meanwhile, tubular image displaying apparatus is constituted as illustrated in FIG. 1C and as described below. Pixels 12 are formed in the front panel of a picture tube 11 by spreading a phosphorescent material thereon, and a shadow mask 13 is installed in the picture tube 11 in such a manner as to keep a proper gap away from the front panel of the picture tube 11. Further, in the other portion of the picture tube 11, an electron gun 14 and a deflecting yoke 15 are installed. Electron beams projected by the electron gun 14 are deflected by the deflecting yoke 15, and impinged on the pixels 12 after passing through the shadow mask 13, so as for the pixels 12 to become luminescent and to make a picture.

However, the above described image displaying apparatus produce only plane images, i.e., 2-dimensional images, to users' unsatisfactorily. Therefore, recently there have been proposed stereoscopic image displaying apparatus for displaying images in a 3-dimensional form.

As shown in FIGS. 2A and 2B, the pixels of the image displaying apparatus consists of odd column pixels 22a and even column pixels 22b, in which the odd column pixels 22a are connected to a column driving IC 23 and to a row driving IC 25 for left image signals and the even column pixels 22b are connected to a column driving IC 24 and to a row driving IC 25 for right image signals.

Further, in front of the pairs of the odd column pixels 22a and the even column pixels 22b, there is installed a convex lens screen 26 as a stereoscopic image producing means. The stereoscopic image displaying apparatus 21 as described above can be also applied to the tubular displaying apparatus such as cathode ray tube.

The stereoscopic image displaying apparatus 21 is operated as described below. An object is photographed by two cameras, and the image signals photographed by means of the left camera are sent to the column driving IC 23 for left image signals, while the image signals photographed by the right camera are sent to the lateral row driving IC 24 for right image signals. Then the left image signals energize the odd columns pixels 22a and the light rays therefrom is projected to the left after being refracted by the front convex lens 26 screen in the direction of arrows "L" of FIG. 2B. Meanwhile, the right image signals energize the even column pixels 22b and the light rays therefrom are projected to the right after being refracted by the front convex lens screen 26 in the direction of dotted arrows "R" of FIG. 2B.

Therefore, if a person watches the screen from the front, the image of the object photographed by the left camera is seen by the left eye of the watching person, and the image of the object photographed by the right camera is seen by the right eye of the watching person, thereby obtaining a stereoscopic effect.

However, such a stereoscopic effect can be obtained when the watching user is positioned at the exact front or within a limited angular range. However, if the user departs from the limited angular range, either set of the leftward or rightward projecting images cannot be seen by the user, or confusion is caused so as for the eyes of the watching user to be tired, thereby degrading the stereoscopic effect.

SUMMARY OF THE INVENTION

The present invention overcomes the above-described disadvantages of the conventional techniques, and provides a stereoscopic image displaying apparatus in which the pixels are arranged in the form of pairs of odd column pixels and even column pixels, and optical polarizing means is installed in front of the odd column pixels and the even column pixels in order to pass light rays only in one direction, so as for the image projected by the odd column pixels to be passed only in the horizontal direction, and so as for the image projected by the even column pixels to be passed only in the vertical direction.

Therefore, if the watching user wears a polarizing glass in which one side of the glass passes only horizontal light rays and the other passes only vertical light rays, the user can watch a clear stereoscopic image regardless of the position of the user, as well as alleviating the exhaustion of eyes.

The stereoscopic image displaying apparatus characterized in that an object is photographed by means of two cameras from the left and right sides, and the image signals so obtained are sent to a driving IC, and IC drives pairs of odd row pixels and even row pixels in order to display the images photographed by the left and right cameras.

The apparatus of the present invention is further provided with optical polarizing means in front of the paris of the odd and even row pixels, capable of passing only rectangularly crossing components of light rays.

BRIEF DESCRIPTION OF THE DRAWINGS

The above object and other advantages of the present invention will become more apparent by describing in detail the preferred embodiment of the present invention with reference to the attached drawings, in which.

DESCRIPTION OF THE PREFERRED EMBODIMENT

The preferred embodiment of the stereoscopic image displaying apparatus according to the present invention will be described in detail referring to the attached drawings below.

Figure 1A:
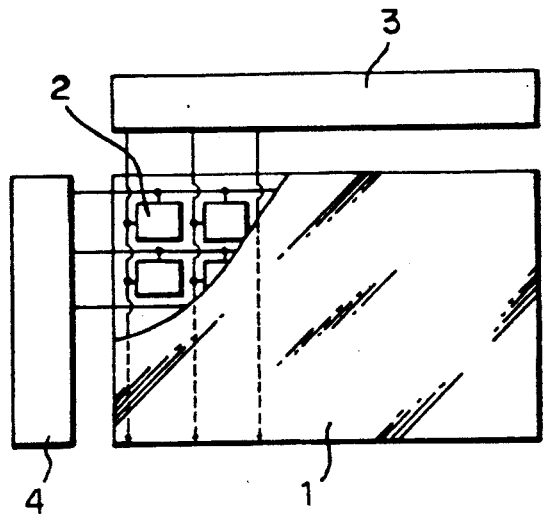
FIGS. 1A to 1C illustrate a conventional image displaying apparatus.
Figure 1C:
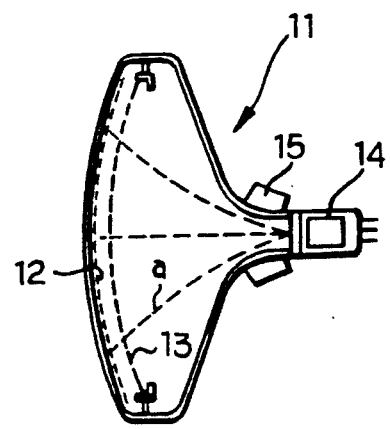
Figure 1B:
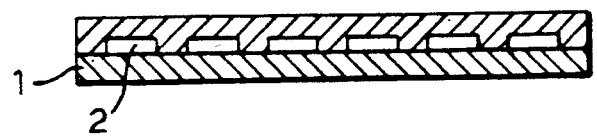
Figure 2A:
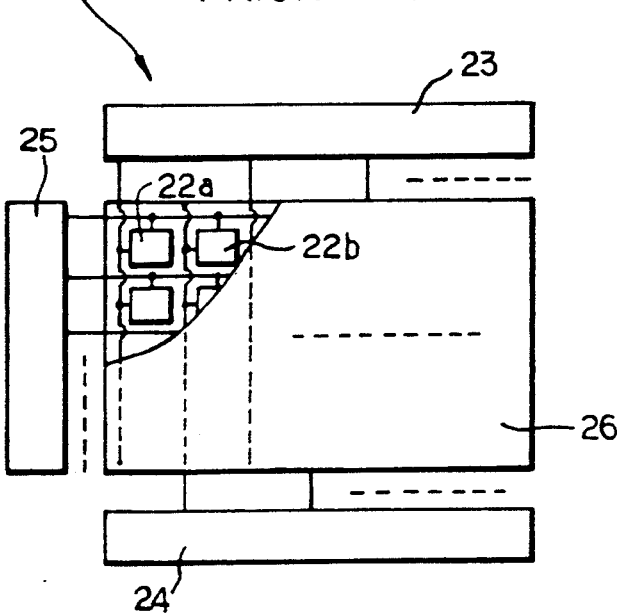
FIGS. 2A and 2B illustrate a the conventional stereoscopic image displaying apparatus.
Figure 2B:
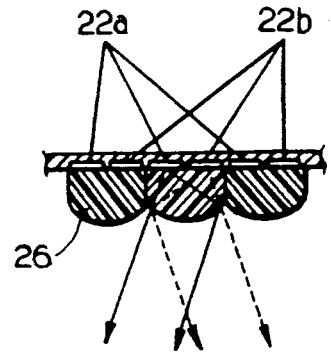
Figure 3A:
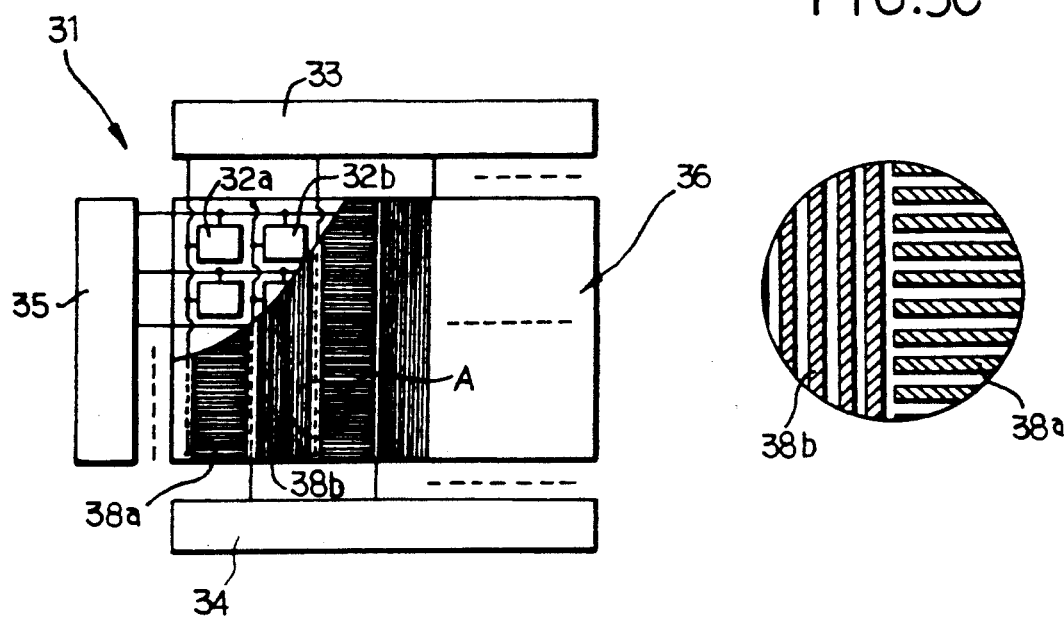
FIGS. 3A and 3B illustrate a stereoscoptic image displaying apparatus according to the present invention.
Figure 3C:
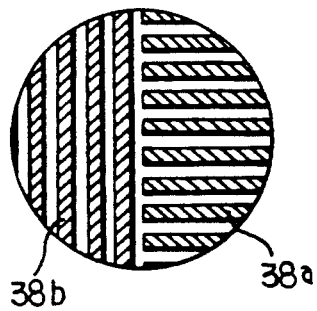
FIG. 3C is an expanded view of portion A of FIG. 3A.
Figure 3B:
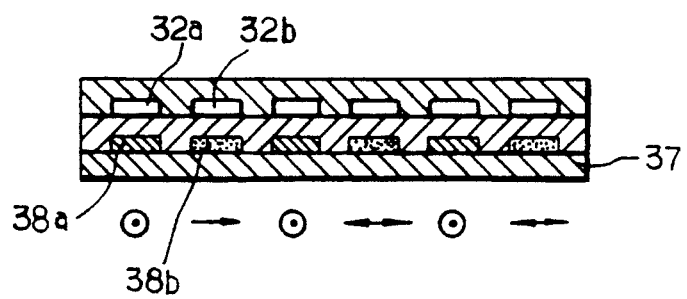

FIGS. 3A to 3C show the constitution of the stereoscopic image displaying apparatus 31 of the present invention. As shown in FIG. 3, in the image displaying pixels according to the present invention, the pixels are arranged by pairing an odd column pixel 32a and an even column pixel 32b repeatedly, and the odd column pixels 32a are connected to a column driving IC 33 and a row driving IC 35 respectively, while the even column pixels 32b are connected to a column driving IC 34 and a row driving IC 35 respectively.

Further, in front of the array of the pairs of the odd column pixels 32a and the even column pixels 32b, there is installed optical polarizing means 36 capable of passing light rays only in one direction. The optical polarizing means 36 is constituted such that a plurality of conductive lines 38a and 38b are arranged laterally and longitudinally at a certain pitch on a transparent substrate 37. The lateral conductive lines 38a and the longitudinal conductive lines 38b are arranged repeatedly with a certain intervals.

Further the conductive lines 38a and 38b are formed by applying an etching process, and the lateral conductive lines 38a are disposed in front of the odd column pixels 32a, while the longitudinal conductive lines 38b are disposed in front of the even column pixels 32b.

Further, the optical polarizing means 36 is made of a material selected from among conductive metals, dichroic crystal end a polymer containing a small amount of additive.

In the apparatus of the present invention as described above, an object is photographed by means of two camera and, as shown in FIG. 3A and 3B, the photographed image signals are sent to the column driving ICs 33 and 34 for the left and right image signals and the row driving IC 35. Then the driving ICs 33, 34 and 35 and the odd and even column pixels 33a and 32b connecting to the driving ICs 33, 34 and 35 are energized to produce luminescence. Under this condition, the odd column pixels 32a project the image photographed from the left side, while the even column pixels 32b project the image photographed from the right side.

Figure 4:
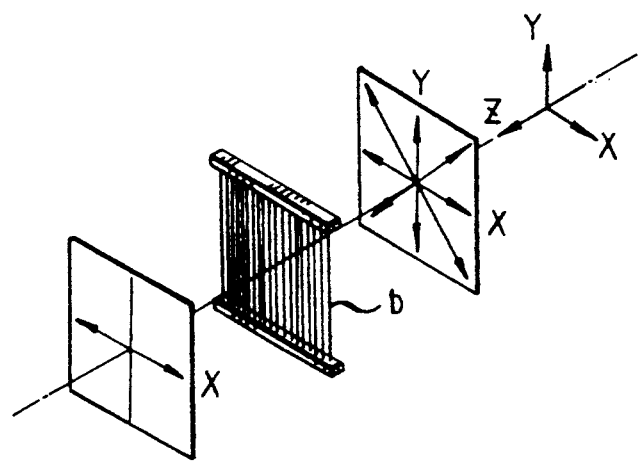
FIG. 4 is a view for explaining operation of the stereoscopic image displaying apparatus according to the present invention.

Under this condition, the light rays projected from the odd and even column pixels 32a and 32b can be generally dissociated into two orthogonal components as shown in FIG. 4. One of the components is parallel with the conductive lines 38a and 38b, and the other is perpendicular to them.

For example, in the case where the conductive line b of the optical polarizing means is disposed in the direction of Y axis, i.e., in the longitudinal direction, the Y component, i.e., the longitudinal component among the light rays projected from the pixels moves the conductive electrons along the conductive lines, thereby producing an electric current in the lines.

Accordingly, the light rays of the Y component are absorbed into a conductor, and the light rays of only the X component are passed through the optical polarizing means. To the contrary, in case that the conductive lines are disposed in the direction of X axis, only Y components of the light rays components projected from the pixels is passed through.

Therefore, only the vertical component of the light rays which are radiated from the odd column pixels 32a is led to pass through by the lateral conductive lines 38a installed at the front, while only the horizontal component of the light rays radiated from the even row pixels 32b is let to pass through by the longitudinal conductive lines 38b installed at the front.

Therefore, if the watching user wears a polarizing glass in which the left one side of the glass can pass only the vertical components and the right one of the glass can pass only the horizontal components, then the left eye of the watching user can see only the image photographed from the left side, while the right eye of the user see only the image photographed from the right side, so that a stereoscopic image should be endowed to the eyes of the watching user.

According to the stereoscopic image displaying apparatus of the present invention as described above, the image photographed from the left side is seen only by the left eye of the watching user, and the image photographed from the right side is seen only by the right eye, thereby forming a stereoscopic image in the eyes of the user. Therefore, stereoscopic images can be provided regardless of the watching position of the watching user, thereby being adaptable to the needs of the user more fully and alleviating the exhaustion of eyes. Further, the apparatus of the present invention can be widely applied to almost all kinds of image displaying apparatus.

What is claimed is:

1. In a stereoscopic image displaying apparatus in which an object is photographed from left and right and the photographed image signals are sent to first and second image signal driving integrated circuits for driving a panel array consisting of pairs of odd column pixels and even column pixels for horizontal scanning, said first integrated circuit generating the left photographed image and said second integrated circuit generating the right photographed image separately, said apparatus further comprising:
    optical polarizing means installed in front of said array of said odd column pixels and said even column pixels, for respectively passing only components of a perpendicular direction among the light rays respectively.

2. The apparatus as claimed in claim 1, wherein said optical polarizing means comprises;
    a transparent substrate, and
    a plurality of conductive lines disposed on said substrate in the lateral and longitudinal directions with a predetermined gaps.

3. The apparatus as claimed in claim 2, wherein said optical polarizing means is formed of a material selected among conductive metals, dichroic crystals, and a polymer containing a predetermined amount of additive.

4. A stereoscopic image displaying apparatus, comprising:
    a panel display comprising first and second columns of pixels with the pixels of the first and second columns in respective row-arranged pairs;
    image means including first and second integrated circuit driving means for horizontal scanning for causing the first and second columns of pixels to luminesce in respective correspondence with image signals from left and right spaced cameras, whereby to produce images respectively corresponding to the image signals; and first and second polarizing means respectively receiving the luminescence of the first and second columns of pixels for respectively transmitting the same with first and second different polarizations, whereby a person wearing left-eye and right-eye polarizing lenses having polarizations corresponding to the first and second polarizations of the transmitted luminescence of the polarizing means can only see the images of the first and second pixel columns that correspond to the image signals of the left and right spaced cameras with the left and right eyes, respectively, for a stereoscopic effect.

5. The stereoscopic image displaying apparatus according to claim 4, wherein directions of the first and second polarizations are perpendicular to each other.

6. The stereoscopic image displaying apparatus according to claim 4, wherein the second polarizing means comprises a transparent substrate over the second column of pixels and a plurality of spaced parallel conductive lines on the substrate.

7. The stereoscopic image displaying apparatus according to claim 4, wherein the first polarizing means comprises a transparent substrate over the first column of pixels and a plurality of spaced parallel conductive lines on the substrate.

8. The stereoscopic image displaying apparatus according to claim 7, wherein the second polarizing means comprises a transparent substrate over the second column of pixels and a plurality of spaced parallel conductive lines on the substrate.

9. The stereoscopic image displaying apparatus according to claim 4, wherein a direction of the second polarization corresponds a direction of the columns of pixels.

10. The stereoscopic image displaying apparatus according to claim 9, wherein the second polarizing means comprises a transparent substrate over the second column of pixels and a plurality of spaced parallel conductive lines on the substrate.

11. The stereoscopic image displaying apparatus according to claim 9, wherein the first polarizing means comprises a transparent substrate over the first column of pixels and a plurality of spaced parallel conductive lines on the substrate.

12. The stereoscopic image displaying apparatus according to claim 11, wherein the second polarizing means comprises a transparent substrate over the second column of pixels and a plurality of spaced parallel conductive lines on the substrate.

13. The stereoscopic image displaying apparatus according to claim 4, wherein a direction of the first polarization corresponds to a direction of the row arrangement of the pairs of pixels.

14. The stereoscopic image displaying apparatus according to claim 13, wherein the second polarizing means comprises a transparent substrate over the second column of pixels and a plurality of spaced parallel conductive lines on the substrate.

15. The stereoscopic image displaying apparatus according to claim 13, wherein the first polarizing means comprises a transparent substrate over the first column of pixels and a plurality of spaced parallel conductive lines on the substrate.

16. The stereoscopic image displaying apparatus according to claim 15, wherein the second polarizing means comprises a transparent substrate over the second column of pixels and a plurality of spaced parallel conductive lines on the substrate.

17. The stereoscopic image displaying apparatus according to claim 13, wherein a direction of the second polarization corresponds a direction of the columns of pixels.

18. The stereoscopic image displaying apparatus according to claim 17, wherein the second polarizing means comprises a transparent substrate over the second column of pixels and a plurality of spaced parallel conductive lines on the substrate.

19. The stereoscopic image displaying apparatus according to claim 17, wherein the first polarizing means comprises a transparent substrate over the first column of pixels and a plurality of spaced parallel conductive lines on the substrate.

20. The stereoscopic image displaying apparatus according to claim 19, wherein the second polarizing means comprises a transparent substrate over the second column of pixels and a plurality of spaced parallel conductive lines on the substrate.

21. In a stereoscopic image displaying apparatus in which an object is photographed from left and right and the photographed image signals are sent to image signal driving IC for driving a pixel array consisting of pairs of odd column pixels and even column pixels by said IC to display the left and right photographed image separately, said apparatus further comprising:

optical polarizing means comprising a transparent substrate, and a plurality of conductive lines disposed on said substrate in the lateral and longitudinal directions with predetermined gaps installed in front of said array of said odd column pixels and said even column pixels, for respectively passing only components of a perpendicular direction among the light rays respectively.

22. The apparatus as claimed in claim 21, wherein said optical polarizing means is formed of a material selected among conductive metals, dichroic crystals, and a polymer containing a predetermined amount of additive.

23. A stereoscopic image displaying apparatus, comprising:

first and second columns of pixels with the pixels of the first and second columns in respective row arranged pairs;

image means for causing the first and second columns of pixels to luminesce in respective correspondence with image signals from left and right spaced cameras, whereby to produce images respectively corresponding to the image signals; and first and second polarizing means respectively receiving the luminescence of the first and second columns of pixels for respectively transmitting the same with first and second different polarizations, wherein the first polarizing means comprises a transparent substrate over the first column of pixels and a plurality of spaced parallel conductive lines on the substrate, whereby a person wearing left-eye and right-eye polarizing lenses having polarizations of the transmitted luminescence of the polarizing means can only see the images of the first and second pixel columns that correspond to the image signals of the left and right spaced cameras with the left and right eyes, respectively, for a stereoscopic effect.

24. The stereoscopic image displaying apparatus according to claim 23, wherein a direction of the first polarization corresponds to a direction of the row arrangement of the pairs of pixels.

25. The stereoscopic image displaying apparatus according to claim 23, wherein a direction of the second polarization corresponds a direction of the columns of pixels.

26. The stereoscopic image displaying apparatus according to claim 23, wherein the second polarizing means comprises a transparent substrate over the second column of pixels and a plurality of spaced parallel conductive lines on the substrate.

* * * * *